Dec. 22, 1964   R. D. MOHLER ETAL   3,162,821
ELECTRONIC CIRCUIT
Filed March 16, 1960

INVENTORS
Robert D. Mohler,
Reid H. Curtis &
John J. Williams
BY
Mueller & Aichele

United States Patent Office 3,162,821
Patented Dec. 22, 1964

3,162,821
ELECTRONIC CIRCUIT
Robert D. Mohler, Glen Ellyn, Reid H. Curtis, Lombard, and John J. Williams, Chicago, Ill., assignors to Motorola, Inc., Chicago, Ill., a corporation of Illinois
Filed Mar. 16, 1960, Ser. No. 15,331
7 Claims. (Cl. 330—40)

This invention relates generally to transistor circuits and in particular to a transistor circuit utilized in an alternating current voltmeter.

Voltmeters should be accurate to an extent commensurate with their use, they should be relatively small and compact, and they should be relatively inexpensive to purchase and maintain. Also, an ideal voltmeter should have a wide application of uses while still maintaining the required accuracy.

In the electronics industry today, there is a tendency to utilize transistors in place of vacuum tubes because of inherent size and weight advantages of transistors, and this is true of metering devices also. However, direct substitution of transistors for vacuum tubes usually cannot be accomplished without substantial modification to the vacuum tube circuits. The use of transistors in measuring devices such as alternating current voltmeters, has presented some problems because of the inherent low impedance of transistors, whereas high input impedance is needed for accurate metering purposes. Although transistor circuits have been developed for use in high impedance alternating current voltmeters, when used in meters having a wide frequency range, such circuits often have the undesirable tendency to oscillate when measuring the voltage across, for example, an inductance.

It is an object of this invention to provide an improved transistorized alternating current voltmeter which is both compact in size and light in weight.

Another object of the invention is to provide an alternating current voltmeter which may accurately measure audio, supersonic, and low radio frequency voltages found in various types of electrical, electronic, and electro-mechanical equipment.

Still another object of the invention is to provide a transistorized alternating current voltmeter which will better withstand voltages that are greater than the maximum reading on the particular scale selected on the voltmeter.

A feature of the invention is the provision of an improved transistorized alternating current voltmeter utilizing a damping resistor network in the input stage to prevent oscillation when the voltmeter is connected across a circuit having inductive reactance.

Another feature of the invention is the provision of an overvoltage protection circuit including diodes in the input stage of a transistorized voltmeter which protect the device from damage when an input voltage is applied which is many times larger than the maximum reading of the selected scale.

Still another feature of the invention is the provision of a voltmeter circuit having an overvoltage protection circuit which includes a current limiting resistor shunted by a high frequency bypass capacitor in the input stage.

Figures 1, 2:
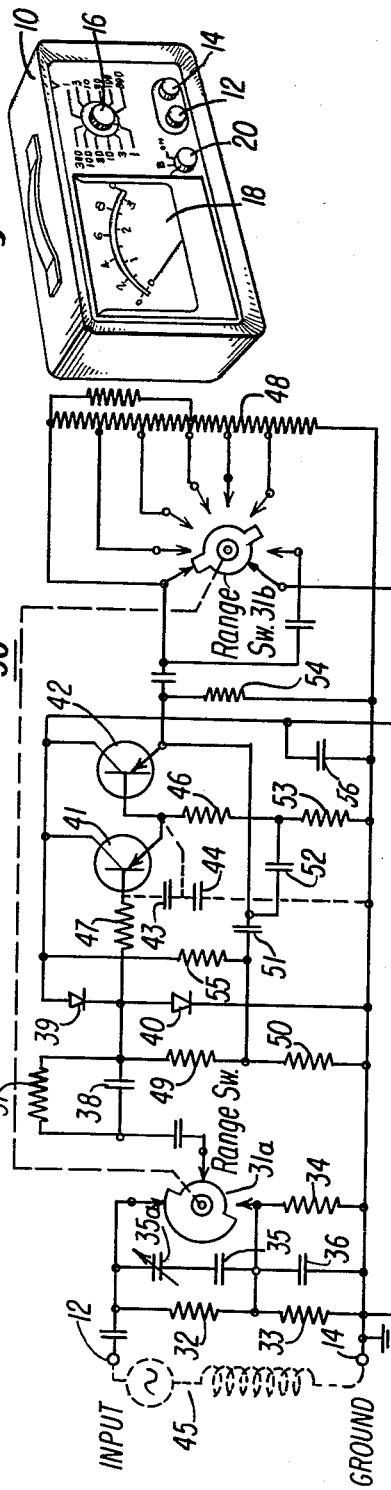
FIG. 1 is a perspective view showing the voltmeter housing.
FIG. 2 is a circuit schematic of the transistorized voltmeter.

In practicing the invention, there is provided an alternating current voltmeter having a completely transistorized circuit which utilizes a single battery unit as its source of power. The input stage of the voltmeter circuit is characterized by an overvoltage protection circuit which includes a resistor shunted by a capacitor and two semiconductor diodes connected to the base and other electrodes of the first transistor in the voltmeter circuit. Another resistor connected to the base of the first transistor prevents the input stage from oscillating when the voltmeter is connected across an inductive circuit. The voltmeter circuit consists of a preamplifier stage, a buffer stage, a first amplifier stage and a second amplifier stage which is connected to a detector and an indicating meter for measuring input voltage. The voltmeter is capable of measuring root mean square voltage values of sine waveshapes, and when a correction table is used, non-sinusoidal waveshapes may be measured. The voltmeter has the accuracy of a laboratory-type device, yet it is portable, light in weight, and may be used in field applications for measuring various voltages.

Referring now to the drawings, FIG. 1 shows a housing 10 containing a transistorized voltmeter having a transistorized circuit which is the subject of the invention. Voltage to be measured is applied across input terminal 12 and ground terminal 14. Range switch knob 16 controls the range selector switch which allows selection of one of twelve ranges. Root mean square voltage value of a sinusoidal waveshape is indicated on meter 18. Knob 20 controls the OFF–BATT.-ON switch which allows the voltmeter to be turned off or on and also allows the voltage of the battery power supply to be checked by the reading of meter 18.

In FIG. 2 is shown a schematic diagram of the voltmeter circuit. The circuit stages consist of a preamplifier stage 30, a buffer stage 60, a first amplifier stage 90, and a second amplifier stage 120. A 6.5 volt mercury battery 122 is the power source for the voltmeter.

Voltage to be measured is applied between input terminal 12 and ground terminal 14 in pre-amplifier stage 30. The division of input signals is determined by range switch 31 and signals are derived across resistors 33 and 34 in parallel with capacitor 36 or across that combination in series with the parallel combination of resistor 32 and the series connected capacitors 35, 35a. Resistor 37 is an overvoltage current limiting resistor and capacitor 38 is a high frequency bypass for resistor 37. Thus, at low frequencies (less than 10 kc.), resistor 37 provides overvoltage protection for the pre-amplifier stage 30 as it is in the current path to the base of transistor 41. At high frequencies, damaging voltages are unlikely to be applied and resistor 37 must be bypassed to maintain the accuracy of the instrument.

The input signals are applied across the series connection of resistors 49 and 50 which are coupled between the junction of resistors 37, 47 and ground. The emitter of transistor 42 is coupled through capacitor 51 to the junction of resistors 49 and 50 and the emitter of transistor 41 is coupled through resistor 46 and capacitor 52 to the emitter of transistor 42. The direct current path for the emitter of transistor 41 is completed through resistor 46 and resistor 53 which is series connected therewith to ground. The emitter of transistor 41 is directly coupled to the base of transistor 42 and the collectors of transistors 41, 42 are directly intercoupled and connected to the B— lead 20b.

The transistors 41, 42 are connected in a "bootstrap" circuit arrangement in order to increase the normally low impedance of a rtansistor amplifier to prevent undue loading of a circuit element the voltage across which is to be measured. Output signals from the preamplifier are derived across resistor 54 which is connected between the emitter of transistor 42 and ground. A portion of the output signal is also applied through capacitor 51 to the junction of resistors 49 and 50 so that there is feedback in the system. A portion of the output signals are also applied through capacitor 52 and resistor 46 to the emitter of transistor 41 in order to greatly increase the effective input impedance appearing across resistors 49, 50.

Semiconductor diodes 39 and 40 provide additional overvoltage protection for the voltmeter. Diodes 39 and 40 are series coupled between the collector of transistor 41 and ground, with the junction of the diodes connected to the input signal circuit at resistor 47. These diodes are normally biased to cut off by the potential obtained from lead 20b. As shown in FIG. 2, resistors 55 and 50 are connected in series between the lead 20b and ground, with their intermediate juncture connected through resistor 49 to the juncture between diodes 39 and 40 to apply a potential thereto. When an input signal voltage is applied which is greater than the sum of the bias voltage and the voltage required for forward conduction on diodes 39 and 40, these diodes will alternately conduct depending on the polarity of the input signal. When the signal applied through resistor 37 to the junction of diodes 39 and 40 is positive, diode 40 conducts the excess current to ground. When the input signal voltage is negative, the signal passes from ground terminal 14, through capacitors 65, 72 and 56 through diode 39, and resistor 37 to input terminal 12. In this way the voltmeter can be protected against damage from accidental connection for example, to 110 volt lines commonly used for power. The voltmeter offers protection even on the low voltage scales.

The inherent emitter-base and collector-emitter capacitance of transistor 41 are shown in broken lines as capacitors 43 and 44. It may be noted that when an inductive signal source 45 is connected across input terminal 12 and ground terminals 14, a Colpitts type oscillator circuit is formed with transistor 41. The Colpitts oscillator circuit consists of the inductance of source 45, capacitors 43 and 44, transistor 41, and resistor 46. To prevent natural oscillation in this circuit resistor 47 is connected between the junction point of diodes 39 and 40 and the base of transistor 41. This resistor has the effect of damping the tuned circuit formed by elements 43-45 to prevent oscillation.

The output of transistor 42 is attenuated (e.g. in 10 db steps) by resistor arrangement 48 which is part of range switch 31 and the output of preamplifier stage 30 is fed to the base of transistor 61. Resistor 62 is the emitter bias resistor and capacitor 63 is a coupling capacitor between the output of transistor 61 in the buffer stage and the base of transistor 91 in the first amplifier stage. Series coupled resistors 66–68 form a voltage divider across B— lead 20b and ground, and the junction of resistors 66, 67 is coupled to the base of transistor 61 for bias. Capacitor 69 is a signal coupling element. A temperature compensating thermistor 64 is connected across resistor 70 of the load resistors 70, 71 in the collector circuit of transistor 61 and thermistor 64 corrects for increased gain at higher temperatures by lowering the load impedance.

The output of buffer stage 60 is fed to the base of transistor 91 in the first amplifier stage 90. Transistors 91 and 92 are connected in cascade. Resistors 100 and 101 are the collector load resistors for transistors 91 and 92. Thermistors 93, 94 and 95 are used in different networks to compensate for the changing characteristics of transistors and diodes due to temperature change. A D.-C. feedback circuit from the collector of transistor 91, through the base and emitter of transistor 92 and through resistor 96 provides voltage stabilization. Coil 103, resistor 104, thermistor 95, and capacitor 99 are used to control high frequency response for improving the band pass characteristic of the amplifier. Potentiometer 97 between the first and second amplifier stages is used for calibrating purposes.

The output of the first amplifier stage is connected through coupling capacitor 98 to the base of transistor 121. Transistors 121 and 123 are connected in cascade as in the first amplifier stage 90. Resistors 126 and 127 are the collector output load resistors for transistors 121 and 123. A D.-C. feedback circuit utilizing input load resistor 128 is used in amplifier stage 120 and this is similar to the D.-C. feedback circuit used in the first amplifier stage 90. Capacitors 129 and 124 are bypass capacitors for emitter bias resistor 142. The output from the collector of transistor 123 is fed through capacitor 130 to a full wave rectifier composed of high frequency diodes 132 and 133 and capacitor 146. Meter 18 is used to measure the resulting direct current voltage from the diodes 132 and 133. Feedback from the junction of diodes 132, 133 to the emitter of transistor 121 is used to improve linearity of response of the rectifier circuit.

When switch 20a is in the battery test position, the reading on meter 18 indicates the voltage across battery 122. In the battery check circuit, the battery voltage is developed across resistor 136. Resistor 125, diode 133, resistor 138, resistor 140, and resistor 144 are connected in series and this combination is shunted across resistor 136. Meter 18 is shunted across resistors 138 and 140.

In a voltmeter of practical construction, parts values of components in preamplifier stage 30 were as follows:

| | |
|---|---|
| Resistor 32 | 10 megohms. |
| Resistor 33 | 10,200 ohms. |
| Capacitor 35a | 5 mmf.–25 mmf. |
| Capacitor 35 | 15 mmf. |
| Capacitor 36 | .0047 mf. |
| Resistor 34 | 1 megohm. |
| Resistor 50 | 180,000 ohms. |
| Resistor 49 | 180,000 ohms. |
| Capacitor 38 | 820 mmf. |
| Resistor 37 | 22,000 ohms. |
| Diode 39 | Silicon type SG559. |
| Diode 40 | Silicon type SG559. |
| Resistor 55 | 100,000 ohms. |
| Capacitor 51 | 15 mf. |
| Capacitor 52 | 15 mf. |
| Resistor 53 | 47,000 ohms. |
| Resistor 46 | 47,000 ohms. |
| Capacitor 56 | .02 mfd. |
| Capacitor 65 | 15 mfd. |
| Capacitor 72 | 500 mfd. |
| Resistor 47 | 560 ohms. |
| Resistor 54 | 10,000 ohms. |
| Transistor 41 | PNP type 2N231. |
| Transistor 42 | PNP type 2N231. |

Thus, the invention provides a transistorized alternating current voltmeter which may be constructed in compact form, and at low cost. It is capable of measuring frequencies from audio level to radio frequency level. The voltmeter maintains its accuracy at various ambient temperatures through the use of temperature compensating resistors in the voltmeter circuit. The voltmeter circuit also has an overvoltage protection circuit which is especially effective at low frequencies such as sixty cycles per second where overvoltages are likely to be inadvertently applied to the voltmeter. Provision has been made in the voltmeter circuit also for stabilizing response and maintaining accuracy through a wide frequency range.

We claim:

1. An input circuit for an electrical measuring instrument including in combination, a transistor having base, emitter and collector electrodes, means for applying input signals between said base electrode and a reference point and including a resistor having a first terminal connected to said base electrode for limiting the current thereto and a second terminal, a bypass capacitor coupled across said resistor, further circuit means coupled to said collector and emitter electrodes for deriving output signals from said transistor and including voltage supply means coupled to said transistor for energizing the same, and overvoltage protection means including a first diode coupled between said collector electrode and said second terminal and a second diode coupled between said second terminal and the reference point, said first and second diodes being poled to be reverse biased by said voltage supply means whereby said diodes conduct upon application thereto of a signal voltage from said input circuit means which exceeds the voltage of said voltage supply means.

2. An input circuit for an electrical measuring instrument including in combination, a transistor having base, emitter and collector electrodes, means for applying input signals between said base electrode and a reference point and further circuit means coupled to said emitter electrode for deriving output signals from said transistor, voltage supply means coupled to said transistor for energizing the same, a first diode coupled between said collector electrode and said base electrode, and a second diode coupled between said base electrode and the reference point, said first and second diodes being poled to be reverse biased by said voltage supply means whereby said diodes conduct upon application thereto of a signal voltage from said input circuit means which exceeds the voltage of said voltage supply means thereby providing overload protection for said input circuit.

3. An input circuit for an electrical measuring instrument adapted to be connected to an inductive reactance across which an alternating current signal is developed including in combination, a transistor having base, emitter and collector electrodes, means for applying the alternating current signal between said base electrode and a reference point and including first and second resistors series connected to said base electrode, a bypass capacitor coupled across said first resistor, circuit means coupled to said collector and emitter electrodes for deriving output signals from said transistor and including voltage supply means coupled to said transistor for energizing the same, said transistor having internal capacitances from said base to emitter electrodes and said base to collector electrodes, said second resistor having a value to provide damping action to thereby reduce the tendency of oscillation of said input circuit when inductive reactance is coupled to said means for applying input signals to said transistor.

4. In a device for measuring the magnitude of alternating current voltages, an input amplifier stage having input supply terminals and including in combination; a transistor having base, collector and emitter electrodes, voltage supply means coupled to said electrodes of said transistor for energizing the same and including first resistor means connected to said emitter electrode, overload protection means including first and second diodes, voltage divider means having an output proportional to the voltage applied to said divider means and a second resistor, said diodes being connected in series between said collector electrode of said transistor and said emitter resistor means, said voltage divider means being connected to said voltage supply means, said voltage divider output being connected to the junction of said diodes and applying a bias thereto to hold the same cut-off, said diodes conducting whenever the voltage at said input supply terminals exceeds the voltage of said junction between said diodes, said second resistor being connected between the junction of said diodes and one of said input supply terminals to limit the current therebetween, and damping means including a third resistor connected between said transistor base electrode and said junction of said diodes, said third resistor reducing the tendency of oscillation of said input stage.

5. In a device for measuring the magnitude of alternating current voltages, an input amplifier circuit including in combination; first and second transistors each having base, collector and emitter electrodes, said transistors being connected as a two-stage cascaded common-collector amplifier with said emitter electrode of said first transistor connected to said base electrode of said second transistor, a reference point, a first input supply terminal connected to said reference point and a second input supply terminal said supply terminals presenting a high input impedance, bias means coupled to said electrodes of said transistors for energizing the same, feedback circuit means coupled from said second transistor emitter electrode to said second terminal and to said base electrode of said second transistor, said feedback circuit means effectively reducing the loading effect of said bias means on said transistors to maintain said high input impedance, and resistor means coupled between said second input supply terminals and said base electrode of said first transistor to provide a damping action whereby the tendency of oscillation of said input stage is effectively reduced.

6. In a device for measuring alternating current voltages of varying frequency and amplitude, an input amplifier circuit including in combination; first and second transistors each having base, collector and emitter electrodes, said transistors being connected as a cascaded two stage common collector amplifier with said emitter electrode of said first transistor being connected to said base electrode of said second transistor, and said collector electrode of said first transistor being connected to said collector electrode of said second transistor, bias means coupled to said electrodes of said transistors for energizing the same and including first resistor means connected between said emitter electrode of said first transistor and a reference potential and second resistor means connected between said emitter electrode of said second transistor and the reference potential, first and second input terminals with said first input terminal being connected to the reference potential, said input terminals presenting a high input impedance, overload protection means including first and second diodes connected in series between said collector electrodes and the reference potential, voltage divider means including third and fourth resistor means series connected between said collector electrodes and said reference potential with the junction point of said third and fourth resistor means being connected to the junction point of said first and second diodes for applying a bias to said diodes, circuit means connecting the junction point of said diodes to said base electrode of said first transistor, feedback circuit means coupled from said second transistor emitter electrode to said junction of said first and second diodes and to said base electrode of said second transistor, said feedback means effectively reducing the loading effect of said bias means to maintain said high input impedance, fifth resistor means connected between said junction of said diodes and said second terminal to limit the current therebetween, said diodes providing over-voltage protection by conducting in response to a voltage at said input supply terminals which exceeds the voltage at said junction point of said diodes.

7. In a device for measuring alternating current voltages of varying frequency and amplitude, an input amplifier circuit including in combination; first and second transistors each having base, collector and emitter electrodes, said transistors being connected as a cascaded two stage common collector amplifier with said emitter electrode of said first transistor being connected to said base electrode of said second transistor, and said collector electrode of said first transistor being connected to said collector electrode of said second transistor, bias means coupled to said electrodes of said transistors for energizing the same and including first resistor means connected between said emitter electrode of said first transistor and a reference potential, first and second input terminals with said first input terminal being connected to the reference potential, said input terminals presenting a high input impedance, overload protection means including first and second diodes connected in series between said collector electrodes and said reference potential, voltage divider means including second and third resistor means series connected between said collector electrodes and the reference potential with the junction point of said second and third resistor means being connected to the junction point of said first and second diodes for applying a bias to said diodes, said diodes providing over-voltage protection by conducting in response to a voltage at said input supply terminals which exceeds the voltage at said diode junction, feedback circuit means coupled from said second transistor emitter electrode to said junction of said first and second diodes and to the base electrode of said second transistor, said feedback means effectively reducing the loading effect of said bias means to maintain said high input impedance, fourth resistor means connected between said junction of diodes and said second terminal to limit the current therebetween, and fifth resistor means connected between said first transistor base electrode and said diode junction, said fifth resistor means providing a damping action to effectively reduce the tendency of oscillation in said input stage.

References Cited in the file of this patent

UNITED STATES PATENTS

| | | |
|---|---|---|
| 2,584,800 | Grisdale | Feb. 5, 1952 |
| 2,760,009 | Boer et al. | Aug. 21, 1956 |
| 2,889,519 | Montgomery | June 2, 1959 |
| 2,936,427 | Smith | May 10, 1960 |
| 3,031,627 | Reichart et al. | Apr. 24, 1962 |

OTHER REFERENCES

"Transistor Voltmeters," by M. Potok et al., at pages 344–346 of Electronic Engineering, August 1955.